US012215651B1

(12) United States Patent
Petrariu et al.

(10) Patent No.: US 12,215,651 B1
(45) Date of Patent: Feb. 4, 2025

(54) CYLINDER HEAD CONFIGURED FOR IMPROVED COOLING PERFORMANCE AND MANUFACTURABILITY

(71) Applicant: Caterpillar Inc., Peoria, IL (US)

(72) Inventors: Viorel Petrariu, Lafayette, IN (US); Jonathan R. Chittenden, West Lafayette, IN (US); Michael D. Gough, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/543,195

(22) Filed: Dec. 18, 2023

(51) Int. Cl.
*F02F 1/40* (2006.01)
*F01P 3/16* (2006.01)
*F02F 1/24* (2006.01)

(52) U.S. Cl.
CPC .................. *F02F 1/40* (2013.01); *F01P 3/16* (2013.01); *F02F 1/242* (2013.01); *F02F 2200/06* (2013.01)

(58) Field of Classification Search
CPC .......... F02F 1/40; F02F 1/242; F02F 2200/06; F01P 3/16; F01P 3/14
See application file for complete search history.

(56) References Cited

U.S. PATENT DOCUMENTS 3,081,755 A * 3/1963 Kotlin ........................ F02F 1/26 123/193.5
3,491,731 A * 1/1970 Deutschmann ........... F02F 1/40 123/41.31
4,625,682 A * 12/1986 Dietrich .................. F02F 1/242 123/41.31
6,279,516 B1 * 8/2001 Haugen ..................... F02F 1/38 123/41.82 R
7,383,794 B2 6/2008 Hlousek et al.
10,605,213 B2 3/2020 Peters et al.
11,286,876 B1 3/2022 Petrariu et al.
11,459,975 B1 10/2022 Petrariu et al.
11,459,976 B2 10/2022 Klampfer et al.
11,536,220 B1 12/2022 Chittenden et al.
11,585,288 B1 2/2023 Chittenden et al.
2006/0196453 A1 * 9/2006 Yamada .................... F02F 1/40 123/41.74
2009/0233116 A1 * 9/2009 Henkel ................... B22C 21/14 164/332
2018/0347507 A1 * 12/2018 Hyde ....................... F02F 1/242
2022/0065191 A1 * 3/2022 Klampfer .................. F02F 1/40

FOREIGN PATENT DOCUMENTS

DE 102012108977 B3 3/2014

* cited by examiner

*Primary Examiner* — Syed O Hasan
(74) *Attorney, Agent, or Firm* — Brannon Sowers & Cracraft PC

(57) ABSTRACT

A cylinder head includes a cylinder head casting having a top deck and a bottom deck, and a coolant cavity. The cylinder head also includes an igniter column including an upper section, and a necked-down lower section extending upwardly from the bottom deck. The igniter column includes an inner surface forming an igniter bore such as for a sparkplug, and an outer heat-dissipation surface. The outer heat-dissipation surface is exposed in circumferential uniformity to the coolant cavity and extends radially inwardly of the inner surface at locations axially between an igniter seat and a bottom deck cavity surface. In some embodiments, a cylinder head includes an enclosed as-cast cooling channel axially between an igniter seat and a bottom deck combustion surface.

9 Claims, 4 Drawing Sheets

CYLINDER HEAD CONFIGURED FOR IMPROVED COOLING PERFORMANCE AND MANUFACTURABILITY

TECHNICAL FIELD

The present disclosure relates generally to a cylinder head, and more particularly to an igniter column in a cylinder head having an outer heat-dissipation surface uniformly exposed to a coolant cavity.

BACKGROUND

Internal combustion engines are used globally for a range of purposes from vehicle propulsion to operation of pumps and compressors, to electrical power generation. Internal combustion engines conventionally include a cylinder block having combustion cylinders therein, and a cylinder head supporting engine valves and having intake and exhaust conduits to convey air and sometimes fuel into the combustion cylinders and carry away exhaust products from combustion. Depending upon the ignition strategy, an igniter such as a sparkplug, a prechamber sparkplug, or a prechamber ignition device, may be supported in the cylinder head. Spark-ignition strategies are commonly used in gaseous fuel and gasoline engines. The cylinder head typically includes relatively complex geometry to provide a flow of liquid coolant through the cylinder head and around the components supported therein to dissipate heat.

Dissipating heat from sparkplugs or other ignition devices has long been recognized as highly important. Cylinder head geometry, materials, and fluid conveyance and external cooling techniques have been engineered in many different ways over the decades in an effort to optimize cooling efficacy. Overheating of certain components, including igniters, can lead to performance degradation or failure. Overheating in relation to other components, including the cylinder head itself, can result in cracking, thermal fatigue, or still other problems. Cooling efficacy also affects the manner in which the engine can be operated and/or performance optimized.

In recent years, a premium has been placed on engine power density, heightening requirements for dissipation of heat and protection of components in an effort to realize theoretically available performance. An inferior capacity for heat-dissipation can limit available engine power output in some instances. U.S. Pat. No. 11,536,220 is directed to one cylinder head design apparently directed at optimizing heat rejection in an effort to realize improved power density and/or other performance parameters.

SUMMARY

In one aspect, a cylinder head includes a cylinder head casting formed of a cast material and including a top deck having a top deck upper surface and a top deck cavity surface, a bottom deck having a bottom deck combustion surface and a bottom deck cavity surface, a coolant cavity formed between the top deck cavity surface and the bottom deck cavity surface, and a plurality of gas exchange conduits extending through the coolant cavity to the bottom deck. The cylinder head further includes an igniter column defining a center axis, and including an upper section extending downwardly from the top deck, and a necked-down lower section formed of the cast material and extending upwardly from the bottom deck. The igniter column further includes an inner surface forming an igniter bore extending upwardly from an igniter seat, and an outer heat-dissipation surface formed on the upper section and the necked-down lower section. The outer heat-dissipation surface is exposed, in circumferential uniformity, to the coolant cavity from the top deck cavity surface to the bottom deck cavity surface, and extends radially inward of the inner surface at locations axially between the igniter seat and the bottom deck cavity surface.

In another aspect, a cylinder head includes a cylinder head casting formed of a cast material and including a top deck having a top deck upper surface and a top deck cavity surface, a bottom deck having a bottom deck combustion surface and a bottom deck cavity surface, a coolant cavity formed between the top deck cavity surface and the bottom deck cavity surface, and a plurality of gas exchange conduits extending through the coolant cavity to the bottom deck. The cylinder head further includes an igniter column defining a center axis, and extending from the top deck to the bottom deck. The igniter column includes an upper section, and a necked-down lower section surrounded by the bottom deck cavity surface. The igniter column includes an outer heat-dissipation surface formed on the upper section and on the lower section. The outer heat-dissipation surface forms a continuously wetted wall of the coolant cavity both circumferentially around the center axis and axially from the top deck to the bottom deck.

In still another aspect, a cylinder head includes a cylinder head casting formed of a cast material and having a top deck, a bottom deck including a bottom deck combustion surface, and a coolant cavity formed between the top deck and the bottom deck. The cylinder head further includes an igniter column defining a center axis and extending between the top deck and the bottom deck. The igniter column includes an inner surface forming an igniter bore extending upwardly from an igniter seat, and an outer heat-dissipation surface. The cylinder head further includes an enclosed as-cast cooling channel fluidly connected to the coolant cavity and extending circumferentially around the center axis at a location axially between the igniter seat and the bottom deck combustion surface.

DETAILED DESCRIPTION

Figure 1:
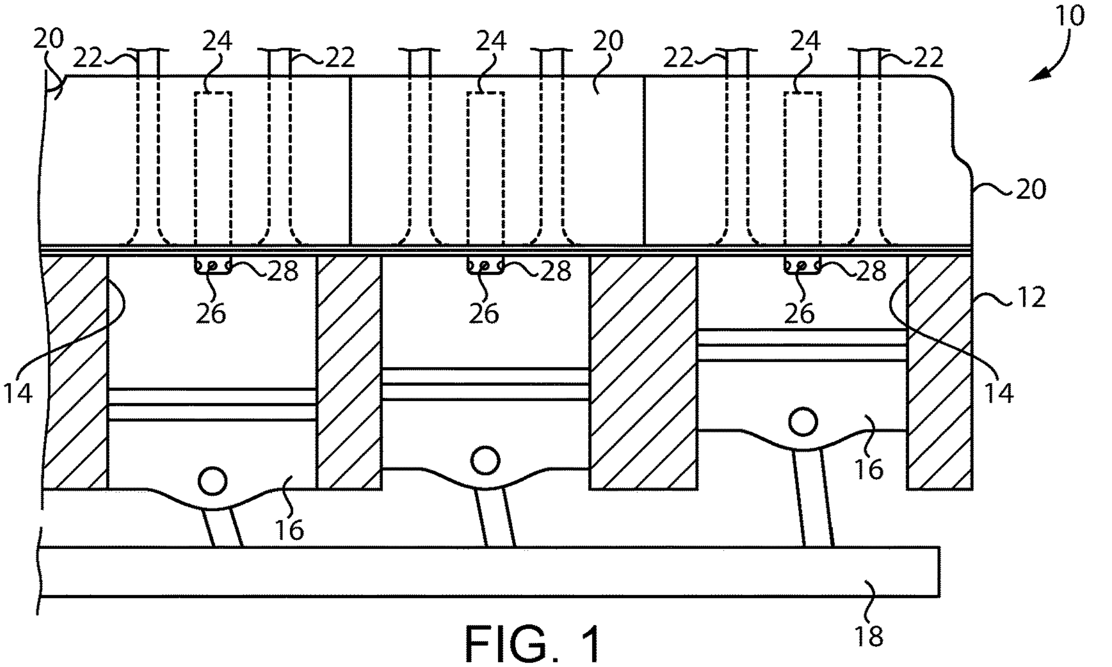
FIG. 1 is a side diagrammatic view of an engine system, according to one embodiment.

Referring to FIG. 1, there is shown an internal combustion engine 10, according to one embodiment. Engine 10 includes a cylinder block 12 having a plurality of combustion cylinders 14 formed therein. A plurality of pistons 16 are within cylinders 14 and movable in a generally conventional manner to rotate a crankshaft 18. Engine 10 also includes a cylinder head 20 attached to cylinder block 12. A plurality of engine valves 22, typically including two intake valves and two exhaust valves, are supported in cylinder head 20 and movable to control opening and closing of combustion cylinders 14 to an intake manifold and an exhaust manifold in a generally conventional manner. Combustion cylinders 14 can include any number in any suitable arrangement such as an in-line pattern, a V-pattern, or still another. In the illustrated embodiment cylinder head 20 is arranged in a plurality of individual cylinder head units or sections, each associated with one combustion cylinder 14. In other embodiments, a cylinder head according to the present disclosure is associated with more than one, and potentially all, cylinders in an engine in a so-called slab cylinder head design. References herein to a “cylinder head” are inclusive of a cylinder head associated with multiple cylinders as well as a cylinder head section associated with a single cylinder.

Engine 10 also includes a plurality of igniters 24 each supported in cylinder head 20. Igniters 24 can include spark igniters, such as prechamber sparkplugs each including within a sparkplug tip 28 one or more spark electrodes. A plurality of holes 26 are formed in each tip 26 to communicate a spark or a rapidly combusting jet of fuel from a prechamber to a main charge of a fuel in the corresponding combustion cylinder 14. Engine 10 may include a gaseous fuel engine, such as an engine operating on natural gas, hydrogen, methane, biogas, mine gas, or various blends. Engine 10 can be applied to rotate a load such as an electrical generator, a pump, a compressor, or a driveline in a vehicle to name a few examples. As will be further apparent from the following description cylinder head 20 may be uniquely configured for dissipating heat from combustion including dissipating heat from igniters 14.

Figure 2:
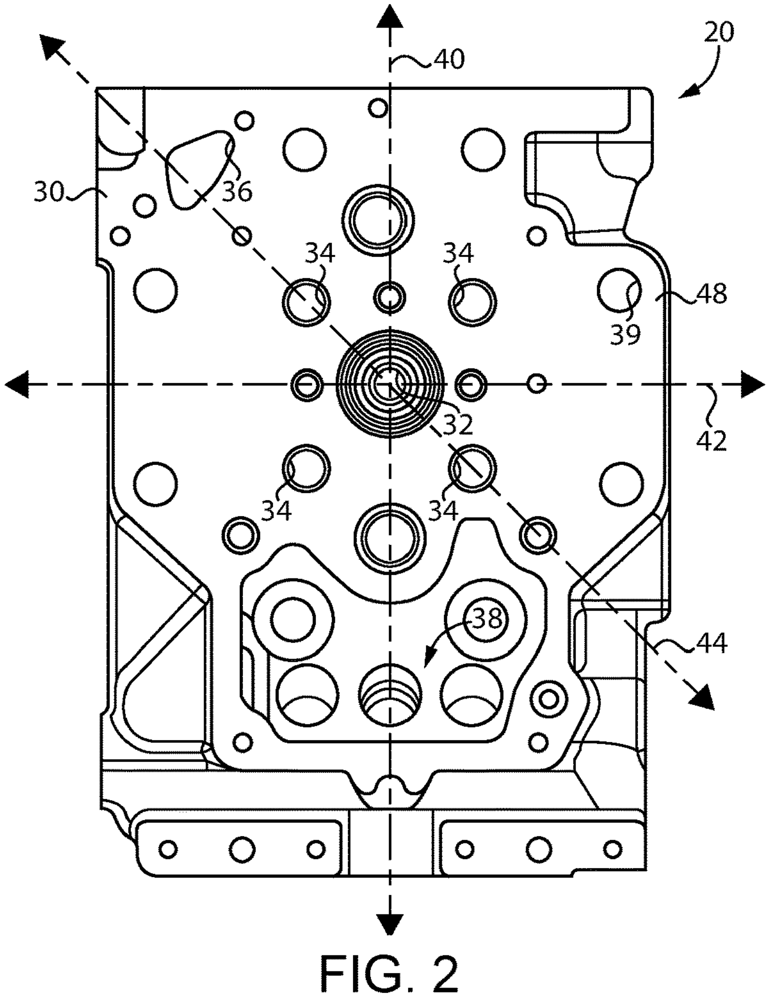
FIG. 2 is a top view of a cylinder head, according to one embodiment.
Figure 3:
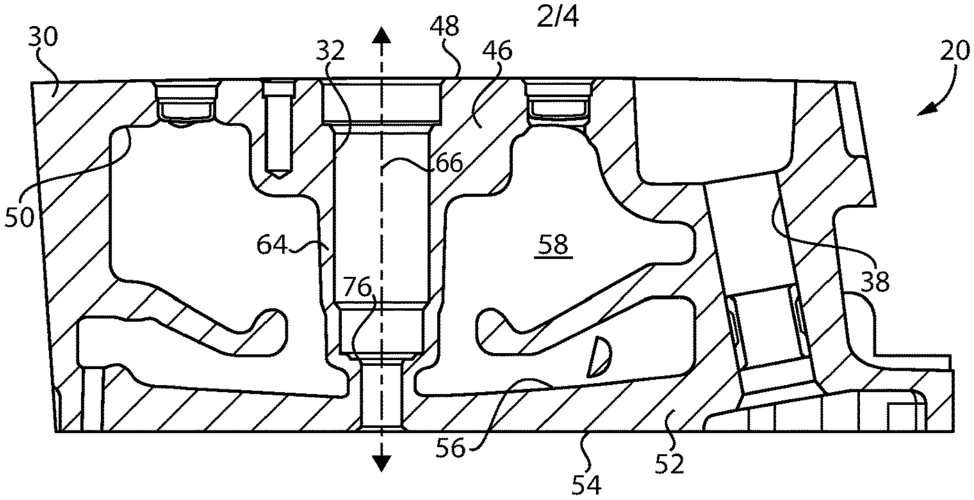
FIG. 3 sectioned side diagrammatic view of a cylinder head in a fore-aft plane, according to one embodiment.

Referring also to FIG. 2, cylinder head 20 includes a cylinder head casting 30 formed of a cast material such as an iron or a steel material, although the present disclosure is not thereby limited. FIG. 2 shows a view of a top deck upper surface 48 of cylinder head casting 30. An igniter bore 32 extends into the page in FIG. 2 from top deck upper surface 48. Cylinder head casting 30 may also include a plurality of engine valve bores 34, such as two bores for receiving two intakes valves and two bores for receiving two exhaust valves. A plurality of bolt holes 39 may also extend through cylinder head casting 30. One or more coolant channels 36 may connect to a coolant cavity further described herein that carries a liquid coolant through cylinder head 20. Valve lifter bores 38 may also extend through cylinder head casting 30.

In FIG. 2, a fore-aft plane is shown at 40. A crank plane that includes a plane longitudinally through an associated crankshaft is shown at 42. An exhaust inboard-intake outboard plane is shown at 44. For purposes of the present description each of planes 40, 42, 44 can be understood as a vertical plane. Plane 42 may be arranged orthogonally to plane 30. Plane 44 may be arranged diagonally relative to each of planes 40 and 42.

Referring also now to FIGS. 3-6, as noted above cylinder head casting 30 may be formed of a cast material. In an implementation, cylinder head casting 30 is one-piece, and includes certain surfaces that are as-cast and certain surfaces that are machined. An as-cast surface as contemplated herein means a surface that substantially retains a surface texture produced from the casting process, and is not modified by removal of material before being placed into service. A machined surface includes a surface that is modified by any form of machining that removes material. An as-cast surface will typically have a surface roughness that is greater than a machined surface, and may have a surface porosity that is greater than that of a machined surface in some instances.

Figure 4:
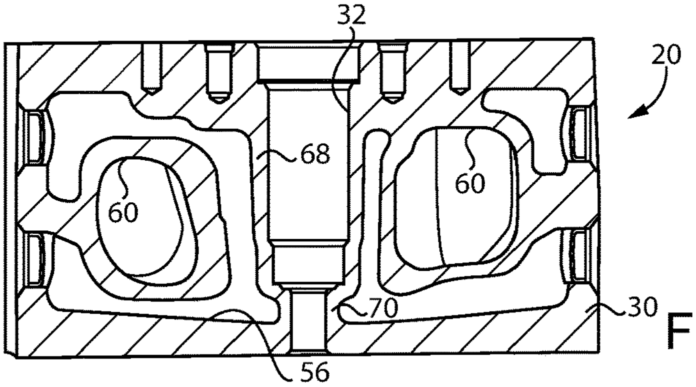
FIG. 4 is a sectioned side diagrammatic view of a cylinder head as in FIG. 3 in a crank plane, according to one embodiment.
Figure 5:
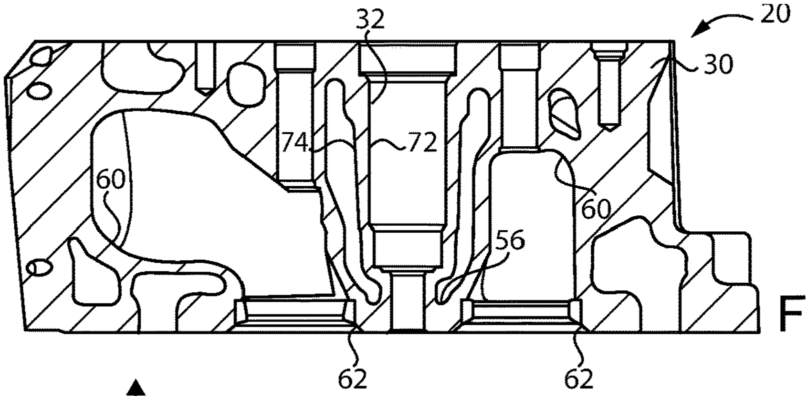
FIG. 5 is a sectioned side diagrammatic view of a cylinder head as in FIG. 3 in an exhaust inboard-intake outboard plane.

Cylinder head 20 and cylinder head casting 30, referred to at times interchangeably herein, include a top deck 46 having top deck upper surface 48 and a top deck cavity surface 50. Cylinder head casting 30 also includes a bottom deck 52 having a bottom deck combustion surface 54 and a bottom deck cavity surface 56. Top deck upper surface 48 and bottom deck combustion surface 54 may each include machined surfaces. Bottom deck combustion surface 54 will be exposed in service directly to an associated combustion cylinder 14. A coolant cavity 58 is formed between top deck cavity surface 50 and bottom deck cavity surface 56. A plurality of gas exchange conduits 60 extend through coolant cavity 58 to bottom deck 52 and terminate at a plurality of gas exchange openings 62. In FIGS. 4 and 5 an exhaust conduit 60 is shown on the left side of the drawing and an intake conduit 60 in shown on the right side of the drawing. It will be appreciated that exhaust conduit 60 will typically be divided so as to extend to two exhaust openings 62, and intake conduit 60 will typically be divided so as to extend to two intake openings 62. Openings 62 may be machined to a conical form and include valve seat inserts (not numbered) in some embodiments.

Cylinder head 20 further includes an igniter column 64 defining a center axis 66. Igniter column 64 includes an upper section 68 extending downwardly from top deck 46, and a necked-down lower section 70 formed by the cast material and extending upwardly from bottom deck 52. In the illustrated embodiment, igniter column 64 is formed of the cast material throughout and is continuous with top deck 46 and bottom deck 52. Igniter column 64 further includes an inner surface 72 forming igniter bore 32, with igniter bore 32 extending upwardly from an igniter seat 76. Igniter seat 76 may include a machined igniter seating face 76 that is planar and oriented, for example, normal to center axis 66. When an igniter is installed in igniter bore 32 for service the igniter may be clamped against igniter seat 76.

Igniter column 64 further includes an outer heat-dissipation surface 74 formed on upper section 68 and necked-down lower section 70. Outer heat-dissipation surface 74 is exposed, in circumferential uniformity, to coolant cavity 58 from top deck cavity surface 50 to bottom deck cavity surface 56. Outer heat-dissipation surface 74 also extends radially inwardly of inner surface 72 at locations axially between igniter seat 76 and bottom deck cavity surface 56. It can also be appreciated that igniter column 64 forms a wetted wall of coolant cavity 58, meaning that outer heat-dissipation surface 74 is wetted by a liquid coolant in and flowing through coolant cavity 58 during service. Outer heat-dissipation surface 74 may form a continuously wetted wall of coolant cavity 58 both circumferentially around center axis 66 and axially from top deck 46 to bottom deck 52, more particularly from top deck cavity surface 50 to bottom deck cavity surface 56. Outer heat-dissipation surface 74 may be as-cast from top deck 46 to bottom deck 52. In some embodiments, outer heat-dissipation surface 74 may be as-cast at least upon necked-down lower section 70 or a lower part thereof. Embodiments are contemplated where each of top deck cavity surface 50, bottom deck cavity surface 56, and outer heat-dissipation surface 74 are all as-cast. It can further be appreciated from the drawings that igniter column 64 includes an outer profile that defines a bottle shape between top deck 46 and bottom deck 52.

Figure 6:
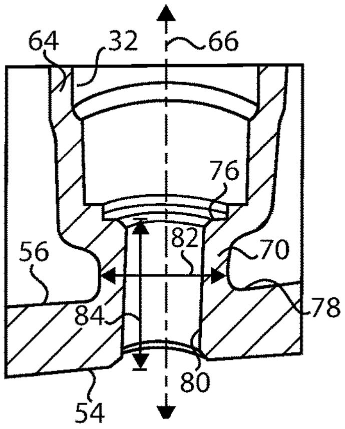
FIG. 6 is a sectioned side diagrammatic view of a portion of a cylinder head as in FIGS. 3-5.

Focusing now on FIG. 6, there are shown certain features of igniter column 64 in further detail. Cylinder head casting 30 may further include a concave transition surface 78 connecting between necked-down lower section 70 and bottom deck cavity surface 56. Concave transition surface 78 may define a uniform profile of rotation around center axis 66. FIG. 6 also shows a plug hole 80 communicating between igniter seat 76 and bottom deck combustion surface 54. Plug hole 80 receives an end portion of an igniter such as a sparkplug installed in igniter bore 32. As can also be noted from FIG. 6, bottom deck cavity surface 56 defines a concave curvilinear profile, in at least one of a fore-aft vertical plane or an orthogonal vertical plane, the concave curvilinear profile originating at concave transition surface 78 and extending upwardly and radially outwardly from concave transition surface 78. The at least one of a fore-aft vertical plane or an orthogonal vertical plane may include fore-aft plane 40 and crank plane 42, respectively, and corresponding to FIGS. 3 and 4. FIG. 6 also shows a minimum diameter dimension 82 defined by necked-down lower section 70, and an axial distance 84 defined between bottom deck combustion surface 54 and machined igniter seating face 76. Axial distance 84 may be greater than minimum diameter dimension 82 in at least some embodiments.

Figure 7:
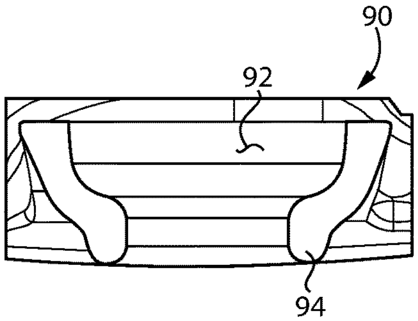
FIG. 7 is a view of a portion of a cylinder head casting mold, according to one embodiment.
Figure 8:
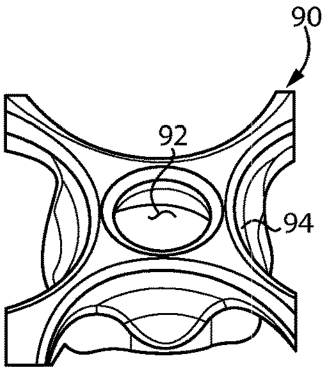
FIG. 8 is another view of the cylinder head casting mold.

Referring now to FIGS. 7 and 8, there are shown views of a mold 90 that might be used in casting cylinder head casting 30. As can be seen in FIG. 7, a void 92 is defined by fill material 94 of mold 90. FIG. 8 illustrates mold 90 approximately flipped over, and in perspective, from the view of FIG. 7. In forming cylinder head casting 30, void 92 will fill with molten metallic material to be cast and take the shape of void 92. It can be seen from FIG. 8 that material of fill 94 has a shape that is circumferentially continuous and uninterrupted around void 92. It can also be noted that fill 94 forms outwardly advancing arms that will produce complementary voids of cavity 58 that can convey coolant uniformly to and around the cast material filling void 92 which is eventually machined to form igniter bore 42 and receive an igniter therein.

Figure 9:
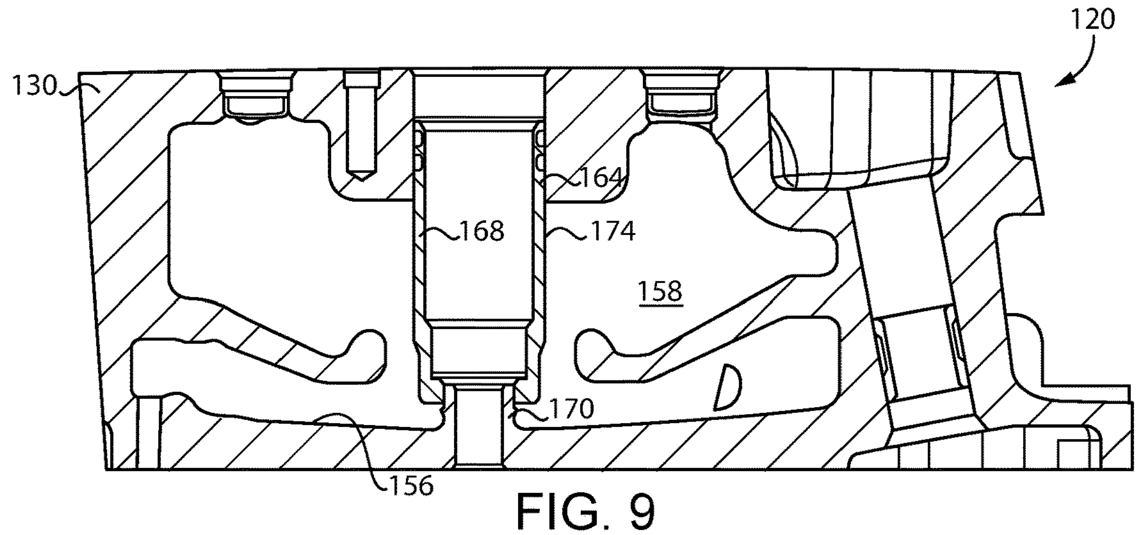
FIG. 9 is a sectioned side diagrammatic view of a cylinder head in a fore-aft plane, according to one embodiment.
Figure 10:
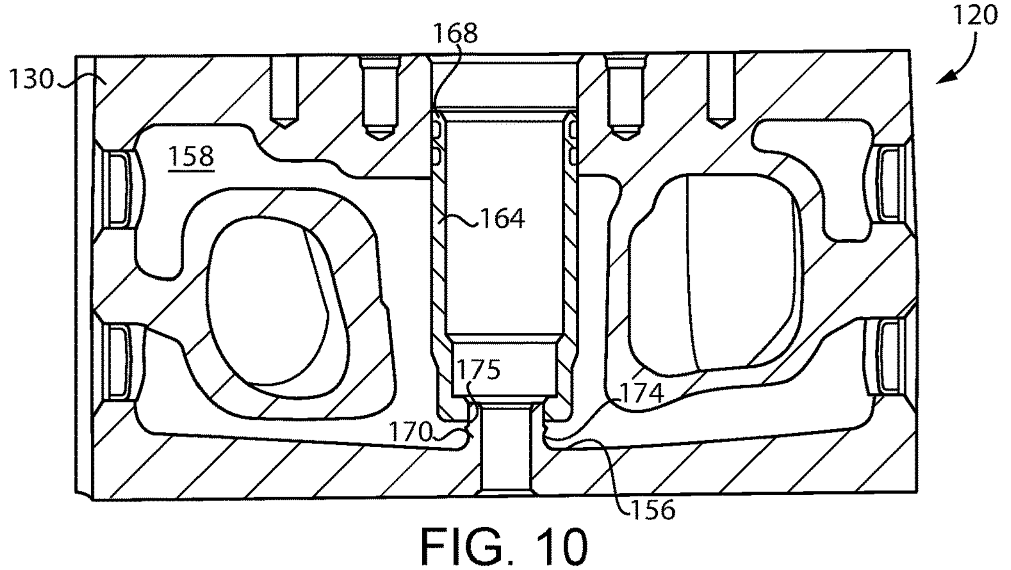
FIG. 10 is a sectioned side diagrammatic view of a cylinder head as in FIG. 9 in a crank plane.
Figure 11:
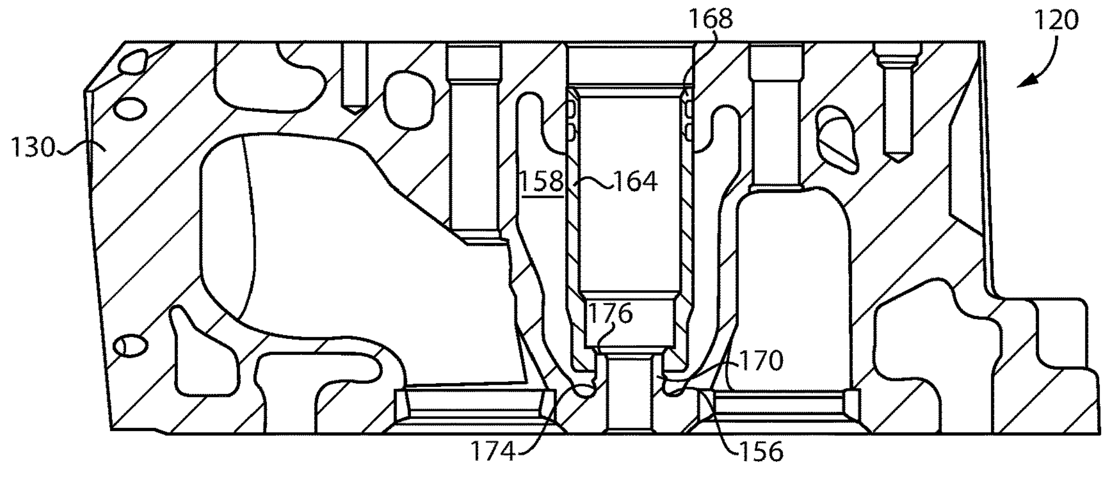
FIG. 11 is a sectioned side diagrammatic view of cylinder head as in FIG. 9 in an exhaust inboard-intake outboard plane.
Figure 12:
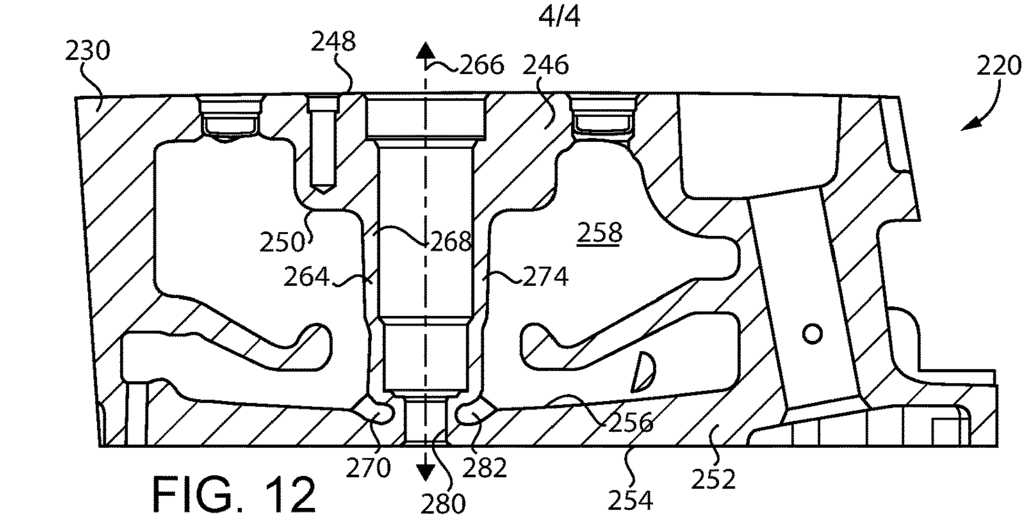
FIG. 12 is a sectioned side diagrammatic view of a cylinder head in a fore-aft plane, according to one embodiment.
Figure 13:
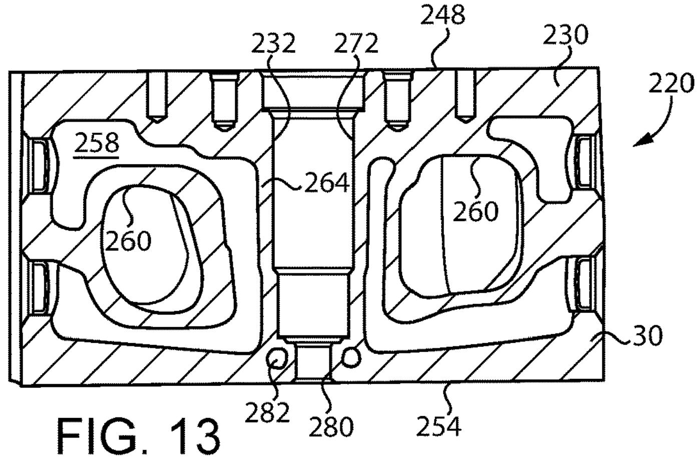
FIG. 13 is a sectioned side diagrammatic view of a cylinder head as in FIG. 12 in a crank plane.
Figure 14:
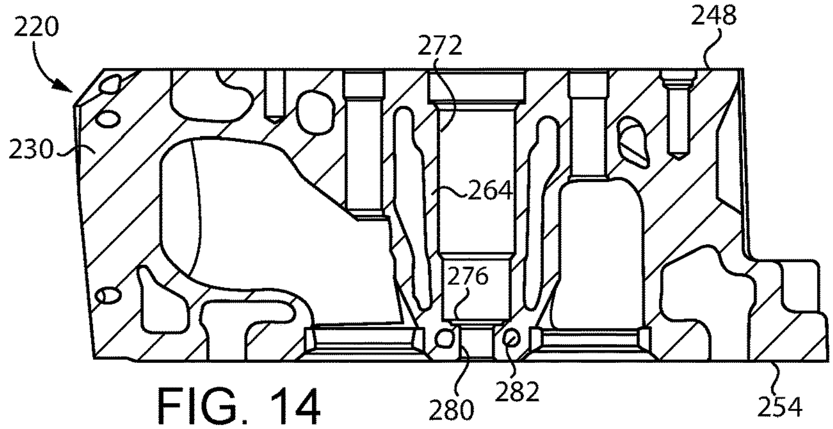
FIG. 14 is a sectioned side diagrammatic view of cylinder head as in FIG. 12 in an exhaust inboard-intake outboard plane.

Turning now to FIGS. 9-11 there is shown a cylinder head 120 including a cylinder head casting 30 having certain similarities with the embodiment of FIGS. 3-6, but certain differences. Cylinder head casting 130 includes a coolant cavity 158, and an igniter column 164 extending though coolant cavity 158 and having an upper section 168 and a necked-down lowered section 170. An interior shape of coolant cavity 158 may be substantially identical to that of cylinder head 20 described above. Igniter column 164 may include an outer heat-dissipation surface 174. A bottom deck cavity surface 156 may be contoured substantially identically to that of bottom deck cavity surface 56 discussed above. In contrast to the foregoing embodiment, instead of an igniter column formed as a cast part of a one-piece cylinder head casting, in cylinder head 120 igniter column 164 is formed in part by a sleeve insert comprising upper section 168 and installed in cylinder head casting 130. It will thus be appreciated that a sleeve insert is provided as a separate part to form upper section 168 and is installed onto lower section 170. Lower section 170 may include an outer surface 174 that is as-cast in a lower portion thereof that transitions downwardly to bottom deck cavity surface 156. An upper portion of outer surface 174 upon necked-down lower section 170 may be machined approximately as shown at 175. Thus, a machining tool may be used to machine outer surface 175 to facilitate installation of a sleeve insert thereon that forms upper section 168.

Turning now to FIGS. 12-15, there is shown a cylinder head 220 according to yet another embodiment. Cylinder head 220 includes a cylinder head casting 230 formed of a cast material and having a top deck 246 including a top deck upper surface 248, and a top deck cavity surface 250. Cylinder head casting 230 further includes a bottom deck 252 including a bottom deck combustion surface 254 and a bottom deck cavity surface 256. A coolant cavity 258 is formed between top deck 246 and bottom deck 252. Gas exchange conduits 260 extend through coolant cavity 258 to bottom deck combustion surface 254. Cylinder head casting 230 also includes an igniter column 264 defining a center axis 266 and extending between top deck 246 and bottom deck 252. Igniter column 264 is formed of the cast material throughout and is continuous with top deck 246 and bottom deck 252 in the illustrated embodiment. Igniter column 264 includes an upper section 268 and a lower section 270. In other embodiments, igniter column 264 could be formed in part by a sleeve insert installed in cylinder head casting 230 similar to the embodiment described above.

Igniter column 264 further includes an inner surface 272 forming an igniter bore, analogous to foregoing embodiments, and extending upwardly from an igniter seat 276. Igniter column 264 also includes an outer heat-dissipation surface 274 that forms a wetted wall of coolant cavity 258. Igniter bore 232 communicates with a plug hole 280 similar to foregoing embodiments. Cylinder head casting 230 includes an enclosed as-cast cooling channel 282. As-cast cooling channel 282 is fluidly connected to coolant cavity 258 and extends circumferentially around center axis 266 at a location axially between igniter seat 276 and bottom deck combustion surface 254. As-cast cooling channel 282 may be enclosed around a majority of a circumference of center axis 266, and includes a toroidal shape as shown.

Figure 15:
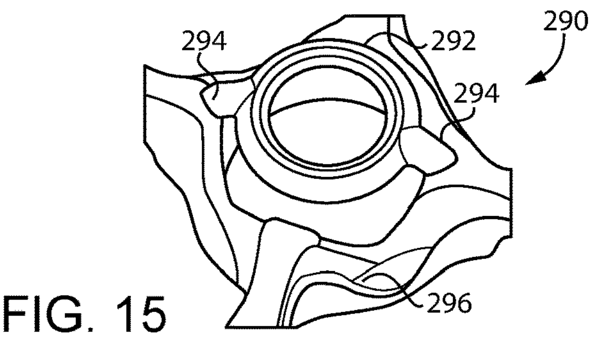
FIG. 15 is a view of a casting mold, according to one embodiment.

Referring also to FIG. 15, there is shown a mold 290 that might be used in casting cylinder head casting 230. Mold 290 includes a channel 292 corresponding to enclosed as-cast cooling channel 282, and fluidly connected to a total of two feed channels 294. It will be appreciated that model 290 is a negative image of cylinder head casting 230, thus channels 294 illustrate locations that will form voids in the finished casting to create complementary feed channels to as-cast cooling channel 282. Fill material of mold 290 is shown as 296.

INDUSTRIAL APPLICABILITY

It will be apparent from the present description that surfaces of a cylinder head casting may be machined or selectively left as-cast. Leaving surfaces as-cast can simplify manufacturing, reducing the number of processing steps necessary to produce a part ready for service. In the case of each of the embodiments described herein all, or substantially all, of a coolant cavity may be as-cast. Moreover, coolant liquid can be conveyed relatively uniformly around surfaces in proximity to an installed igniter to optimize heat rejection. Cylinder head castings according to the present disclosure can be manufactured as original equipment, or as replacement parts to be swapped out for a used cylinder head in a scheduled overhaul, or to replace a damaged cylinder head, for example.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cylinder head comprising:

a cylinder head casting formed of a cast material and including a top deck having a top deck upper surface and a top deck cavity surface, a bottom deck having a bottom deck combustion surface and a bottom deck cavity surface, a coolant cavity formed between the top deck cavity surface and the bottom deck cavity surface, and a plurality of gas exchange conduits extending through the coolant cavity to the bottom deck;

an igniter column defining a center axis, and including an upper section extending downwardly from the top deck, and a necked-down lower section formed of the cast material and extending upwardly from the bottom deck;

the igniter column further including an inner surface forming an igniter bore extending upwardly from an igniter seat, and an outer heat-dissipation surface formed on the upper section and the necked-down lower section;

the outer heat-dissipation surface is exposed, in circumferential uniformity, to the coolant cavity from the top deck cavity surface to the bottom deck cavity surface, and extends radially inward of the inner surface at locations axially between the igniter seat and the bottom deck cavity surface;

the cylinder head casting further including a concave transition surface connecting between the necked-down lower section and the bottom deck cavity surface and defining a uniform profile of rotation around the center axis; and wherein the igniter column is formed of the cast material throughout and is continuous with the top deck and the bottom deck, and at least a portion of the outer heat-dissipation surface is as-cast.

2. The cylinder head of claim 1 wherein the outer heat-dissipation surface is as-cast upon the necked-down lower section, and the igniter seat includes a machined igniter seating face.

3. The cylinder head of claim 1 wherein the bottom deck cavity surface defines a concave curvilinear profile, in at least one of a fore-aft vertical plane or an orthogonal vertical plane, originating at the concave transition surface and extending upwardly and radially outwardly from the concave transition surface.

4. The cylinder head of claim 3 wherein the bottom deck cavity surface defining the concave curvilinear profile is as-cast.

5. The cylinder head of claim 1 wherein each of the top deck cavity surface, and the bottom deck cavity surface is as-cast.

6. The cylinder head of claim 5 wherein the igniter column defines a bottle shape between the top deck and the bottom deck.

7. A cylinder head comprising:

a cylinder head casting formed of a cast material and including a top deck having a top deck upper surface and a top deck cavity surface, a bottom deck having a bottom deck combustion surface and a bottom deck cavity surface, a coolant cavity formed between the top deck cavity surface and the bottom deck cavity surface, and a plurality of gas exchange conduits extending through the coolant cavity to the bottom deck;

an igniter column defining a center axis, and extending from the top deck to the bottom deck, the igniter column including an upper section, and a necked-down lower section surrounded by the bottom deck cavity surface; and the igniter column including an outer heat-dissipation surface formed on the upper section and on the lower section, the outer heat-dissipation surface forming a continuously wetted wall of the coolant cavity both circumferentially around the center axis and axially from the top deck to the bottom deck;

wherein the outer heat-dissipation surface is as-cast from the top deck to the bottom deck;

wherein the igniter column includes an inner surface forming an igniter bore extending upwardly from a machined igniter seat, and the outer heat-dissipation surface extends radially inward of the inner surface at locations between the bottom deck cavity surface and the machined igniter seat;

wherein the cylinder head casting further includes a concave transition surface connecting between the necked-down lower section and the bottom deck cavity surface and defining a uniform profile of rotation around the center axis; and wherein the bottom deck cavity surface defines a concave curvilinear profile, in at least one of a fore-aft vertical plane or an orthogonal vertical plane, originating at the concave transition surface and extending upwardly and radially outwardly from the concave transition surface.

8. The cylinder head of claim 7 wherein the necked-down lower section defines a minimum diameter dimension, and an axial distance greater than the minimum diameter dimension is defined between the bottom deck combustion surface and the machined igniter seat.

9. The cylinder head of claim 7 wherein:

the igniter column is formed of the cast material throughout and is continuous with the top deck and the bottom deck; and each of the top deck cavity surface, the bottom deck cavity surface, and the outer heat-dissipation surface is as-cast.

* * * * *